US011487555B2

(12) United States Patent
Chan et al.

(10) Patent No.: US 11,487,555 B2
(45) Date of Patent: Nov. 1, 2022

(54) RUNNING PBS JOBS IN KUBERNETES

(71) Applicant: Tencent Technology (Shenzhen) Company Limited, Shenzhen (CN)

(72) Inventors: Matthew Chan, Shenzhen (CN); Chee-Kong Lee, Shenzhen (CN); Qiming Sun, Shenzhen (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 260 days.

(21) Appl. No.: 16/896,807

(22) Filed: Jun. 9, 2020

(65) Prior Publication Data

US 2021/0382728 A1 Dec. 9, 2021

(51) Int. Cl.
*G06F 9/44* (2018.01)
*G06F 9/445* (2018.01)
*G06F 9/455* (2018.01)
*G06F 8/61* (2018.01)
*G06F 9/50* (2006.01)
*G06F 9/48* (2006.01)

(52) U.S. Cl.
CPC ............ *G06F 9/44505* (2013.01); *G06F 8/63* (2013.01); *G06F 9/45533* (2013.01); *G06F 9/4843* (2013.01); *G06F 9/5027* (2013.01)

(58) Field of Classification Search
None
See application file for complete search history.

(56) References Cited

U.S. PATENT DOCUMENTS

| 10,963,349 | B2 * | 3/2021 | Dhamdhere | G06F 11/1451 |
|---|---|---|---|---|
| 2019/0228303 | A1 * | 7/2019 | Liu | G06N 3/08 |
| 2019/0370058 | A1 * | 12/2019 | Gupta | G06F 9/466 |
| 2020/0004575 | A1 | 1/2020 | Bailey et al. | |
| 2020/0026545 | A1 | 1/2020 | Wang et al. | |
| 2020/0104170 | A1 | 4/2020 | Else et al. | |
| 2020/0117504 | A1 | 4/2020 | Bahl et al. | |
| 2020/0264899 | A1 * | 8/2020 | Kalinin | G06F 9/4494 |
| 2021/0011762 | A1 * | 1/2021 | Lin | G06F 9/4881 |

FOREIGN PATENT DOCUMENTS

| CN | 108694053 A | * 10/2018 | ............... G06F 8/71 |
|---|---|---|---|
| CN | 110321207 A | * 10/2019 | ........... G06F 9/4843 |
| CN | 110825705 A | * 2/2020 | |

OTHER PUBLICATIONS

International Search Report and Written Opinion of the International Application PCT/US21/23278 dated Jun. 7, 2021, 9 pages.

* cited by examiner

*Primary Examiner* — Insun Kang
(74) *Attorney, Agent, or Firm* — Crowell & Moring LLP (57) ABSTRACT

A system is configured to run jobs in Kubernetes based on PBS job inputs. The system may convert a PBS input, such as in the form of a PBS job command line input and/or a PBS job script, to a Kubernetes job configuration file. A Kubernetes system may then perform a job according to the Kubernetes job configuration file. Through implementation of the conversion process, PBS users can leverage the capabilities of Kubernetes to have jobs performed without having to know how to use Kubernetes.

18 Claims, 4 Drawing Sheets

RUNNING PBS JOBS IN KUBERNETES

FIELD OF THE TECHNOLOGY

The present disclosure relates to the field of computer job scheduling software tools, and more specifically to running portable batch system (PBS) jobs in Kubernetes environments.

BACKGROUND OF THE DISCLOSURE

Portable Batch System (PBS) is a popular cluster management tool for Unix high performance computing (HPC) clusters, especially in academia. However, using computer clusters with PBS can be costly and inefficient. For example, a university may spend millions of dollars on computer clusters, and even more money on operators to operate and maintain the computer clusters. In addition, the number of computers and resources within a cluster is limited, and so at certain times when the cluster has more jobs than it can handle, execution of certain jobs can be undesirably delayed. At other times, computer resources within the cluster may not be used, resulting in wasted power consumption and other unnecessary cost and resource consumption. As such, ways to enable a PBS environment and PBS users to more efficiently use clusters to perform jobs is desirable.

SUMMARY

The present description describes systems, methods, and apparatuses for running portable batch system (PBS) jobs in a Kubernetes system or environment, and/or for converting PBS job inputs into Kubernetes job configuration files. In one example embodiment, a method includes: receiving, with at least one processor, a portable batch system (PBS) job input; parsing, with at least one processor, the PBS job input to determine a plurality of PBS job attributes; generating, with the at least one processor, a Kubernetes job configuration file based on data values of the PBS job attributes; and executing, with the at least one processor, a Kubernetes job according to the Kubernetes job configuration file. In another embodiment, a system including at least one processor is configured to execute computer code in order to perform the above method. In still another embodiment, a non-transitory computer readable storage medium stores instructions that are executable by at least one processor to perform the above method. Additional embodiments are described in further detail below.

It is to be understood that the above general descriptions and the following detailed descriptions are merely exemplary, and cannot limit the present disclosure.

BRIEF DESCRIPTION OF THE DRAWINGS

The accompanying drawings, which are incorporated herein and constitute a part of this specification, illustrate embodiments consistent with the present disclosure and, together with the description, serve to explain the principles of the present disclosure.

DESCRIPTION OF EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. Implementations described in the following exemplary embodiments do not represent all implementations consistent with the present disclosure. On the contrary, the implementations described in the following exemplary embodiments are merely examples of apparatuses and methods consistent with some aspects of the present disclosure as described in detail in the appended claims.

The present description describes a system that runs portable batch system (PBS) jobs in a Kubernetes system or environment. A Kubernetes system may perform jobs more efficiently and/or more cost effectively compared to a PBS system, and as such, it may be desirable for a user, or a plurality of users, to have a job, or a plurality of jobs over a period of time, performed using Kubernetes rather than a PBS. However, the user(s) may already have PBS integrated into their computer systems, and may be knowledgeable how to program and run jobs in PBS. For example, PBS is a popular software tool used in universities, and many of the professors, other faculty, and students, have knowledge in how to program and otherwise use PBS to perform various jobs. Kubernetes is an entirely different tool operating according to different specifications and rules. As such, to have jobs performed in Kubernetes, the user(s) would not only have to incur added expenses to have access to Kubernetes, but would also incur added costs and time to learn how to program and otherwise use a Kubernetes tool.

The present description describes a computer-implemented conversion tool that converts a PBS job input, such as in the form of a PBS job script and/or a PBS job command line input, into a Kubernetes job configuration file that a Kubernetes system uses to run the job. A user can enter into a system, such as through an interface of a computer terminal, a PBS input to run a job, just as the user normally would for PBS, except for a relatively small difference in the formatting of an input command to have the job run in Kubernetes instead of PBS. For example, the user may input "kube-qsub" instead of "qsub." Otherwise, the user can create PBS job inputs, such as in the form of scripts and command line inputs, just as he/she normally would to have jobs run in a PBS system. Upon detecting the input command, the system is configured to convert the PBS job input into a Kubernetes job configuration file that the Kubernetes system then uses to run the job in Kubernetes.

The PBS job input, when entered into the computer system, is data stored, at least temporarily, in a memory of the computer system that comprises data values informing a computer configured with a PBS tool how to run a PBS job. The conversion tool obtains those data values and includes or populates them into particular locations or fields of a data structure, defined by a Kubernetes job template, and according to a set of predetermined conversion rules, in order to generate the Kubernetes job configuration file. The Kubernetes computer system then accesses the data structure defining the Kubernetes job configuration file, and uses the data values in the Kubernetes job configuration file to run an associated job in Kubernetes.

Effectively, the conversion tool forms an improved PBS computer process for running jobs in that it provides computer functionality that links a PBS job input with a Kubernetes system and converts, according to a predetermined set of conversion rules, first data sets formatted for execution by a PBS computer system to run jobs into second data sets formatted for execution by a Kubernetes system in order to more efficiently run the jobs.

Figure 1:
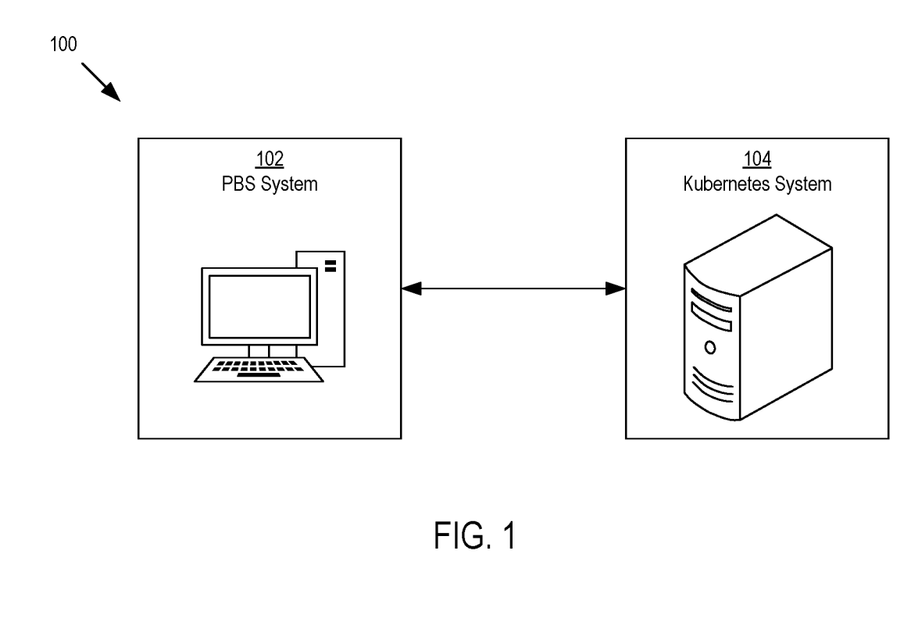
FIG. 1 is a schematic diagram of an example system including a portable batch system (PBS) system and a Kubernetes system.

FIG. 1 is a schematic diagram of an example electronic system or implementation environment 100 that is configured to execute or run portable batch system (PBS) jobs using Kubernetes. As shown in FIG. 1, the system 100 includes a PBS system 102 and a Kubernetes system 104. In general, a PBS system 102 is at least one computing device, such as a single computing device or a plurality or network of computing devices, configured to perform PBS jobs. The computing device(s) in the PBS system 102 may include at least one processor, such as a single processor or a plurality of processors, that is configured to execute computer code or instructions of a PBS software (or PBS software tool, package, platform, or the like) stored in memory of the PBS system 102. Non-limiting examples of PBS software include OpenPBS, Terascale Open-source Resource and QUEue Manager (TORQUE), or Altair PBS Professional™.

In addition, in the PBS system 102, a PBS job has associated with, and/or is defined by, an associated PBS job input that includes one or more fields, each including or populated with one or more data values that define and/or indicate one or more of the specifications, details, and/or parameters of the PBS job. The PBS system 102 is configured to execute a PBS job according to the data value(s) of the associated PBS job input. The PBS system 102, including its at least one computing device and/or at least one processor, may be configured to receive, identify, read, parse, recognize, and/or determine PBS job input formatted according to predetermined PBS formatting rules, definitions, and/or specifications according to which the PBS software is configured, and execute the PBS jobs according to the PBS job inputs and/or the data values included in the PBS job inputs. A PBS job input may include, or be in the form of, a single job command or a plurality of job commands entered into one or more command lines, a PBS job script, or a combination thereof.

In various embodiments, the at least one processor, upon executing the PBS software, is configured to read or parse a PBS job input in order to identify one or more PBS jobs indicated by the PBS job input, and execute or run the one or more PBS jobs. Also, in various embodiments, a PBS job input is a human-generated user input that a user of the PBS system 102 enters into to the PBS system 102, such as through use of an input device (such as a keyboard, a touchscreen, or a microphone, as non-limiting examples) included in, or otherwise coupled to, the PBS system 102. In other example embodiments, the PBS job input is a non-human generated input. For example, a robot or artificial intelligence may input or enter a PBS job input into the PBS system 102 using an input device. As another example, a computing device may generate a PBS job input and send the PBS job input to the PBS system 102. As another example, a computing device of the PBS system 102 may internally generate a PBS job input, and then execute a PBS job according to the PBS job input. Other examples may utilize a combination of humans and machines to generate and input a PBS job input. For example, a person may input a PBS job input into a non-PBS computing device not part of the PBS system 102, and the non-PBS computing device may input the PBS job input into the PBS system 102. In other examples, a PBS job input may be stored remotely from the PBS system 102, and upon being triggered, the PBS system 102 may remotely access the PBS job input, and perform one or more PBS jobs according to the remotely accessed PBS job input. Various ways that a PBS system 102 receives a PBS job input to perform a PBS job may be possible.

Also, in general, a job is a unit of work that at least one computing device and/or at least one processor executes from start to finish in order for a computer task or function to be performed. A job may be the entirety of a given task or function, or may be a portion or part of a given task or function. A job may be defined or identified by an associated set of one or more commands or instructions. Also, in various embodiments, when at least one computing device or processor performs a job, it performs the job continuously from start to finish without user or other external intervention or interruption.

In addition, the Kubernetes system 104 is at least one computing device, such as a single computing device or a network of computing devices, configured to perform Kubernetes jobs. In general, Kubernetes is a container cluster management system configured to perform automatic deployment, expansion, and container operations between cluster hosts and uses a container as a central infrastructure. In general, a cluster (also called a computer cluster) is a set of connected computers, called nodes, working together as a single system. Also, in general, a container is a software, or a unit of software, that packages code for an application along with dependencies the code needs upon being executed at runtime. In various embodiments, the Kubernetes system 104 is implemented as an open source platform. In addition or alternatively, in various embodiments, the Kubernetes system 104 is implemented in cloud computing. For example, in various embodiments, Kubernetes is the technology used by a cloud service provider. The computing device(s) in the Kubernetes system 104 may include at least one processor, such as a single processor or a plurality of processors, that is configured to execute computer code or instructions of Kubernetes software stored in memory of the Kubernetes system 104.

In addition, a Kubernetes system 104, including its at least one computing device and/or at least one processor, may be configured to receive, identify, read, parse, recognize, and/or determine Kubernetes inputs formatted according to predetermined Kubernetes formatting rules, definitions, and/or specifications according to which the Kubernetes software is configured, and execute the Kubernetes jobs according to the Kubernetes inputs. In particular embodiments, a Kubernetes job creates one or more pods and ensures that the one or more pods successfully terminate. In Kubernetes, a pod is a group of one or more containers. In particular embodiments, the containers of a pod have shared storage and a shared specification for how to run one or more given containers. Accordingly, when the Kubernetes system 104 executes a Kubernetes job, the Kubernetes system 104 creates one or more associated pods, executes the instructions or code included in the one or more pods, tracks successful completion of the one or more pods, and determines that a Kubernetes job is complete when a predetermined number of the one or more pods successfully completes. In various embodiments, the Kubernetes system 104 is configured to execute a Kubernetes job by running or executing multiple pods in parallel.

In particular embodiments, a Kubernetes input is a Kubernetes job configuration file. In general, the Kubernetes system 104 may identify various kinds of Kubernetes objects. A Kubernetes object is an entity in the Kubernetes system 104 that represents a state of a given cluster. In various embodiments, an object describes or indicates one or more of: what containerized applications are running and/or on which nodes they are running, resources available for the containerized applications, and policies around how those applications behave, such as restart policies, upgrades, and fault-tolerance. A given object in the Kubernetes system 104 may be in the form of an object configuration file, which includes a plurality of fields containing data values characterizing or defining the given object. A given data value may be a number, a letter word or phrase (such as in the form of a character string), or a combination of letters and numbers, depending on the type of information indicated by a field of the object configuration file. One kind of Kubernetes object is a Kubernetes job. As such, a given Kubernetes job may have, and/or be defined by, an associated Kubernetes job configuration file that includes a plurality of fields populated with data values that define or characterize the given Kubernetes job. The Kubernetes system 104 may receive as a Kubernetes input, or itself may generate, a Kubernetes job configuration file for a given Kubernetes job. In turn, the Kubernetes system 104 may analyze a Kubernetes job configuration file for a given Kubernetes job, and execute the given Kubernetes job according to the data values included in the associated Kubernetes job configuration file.

Figure 2:
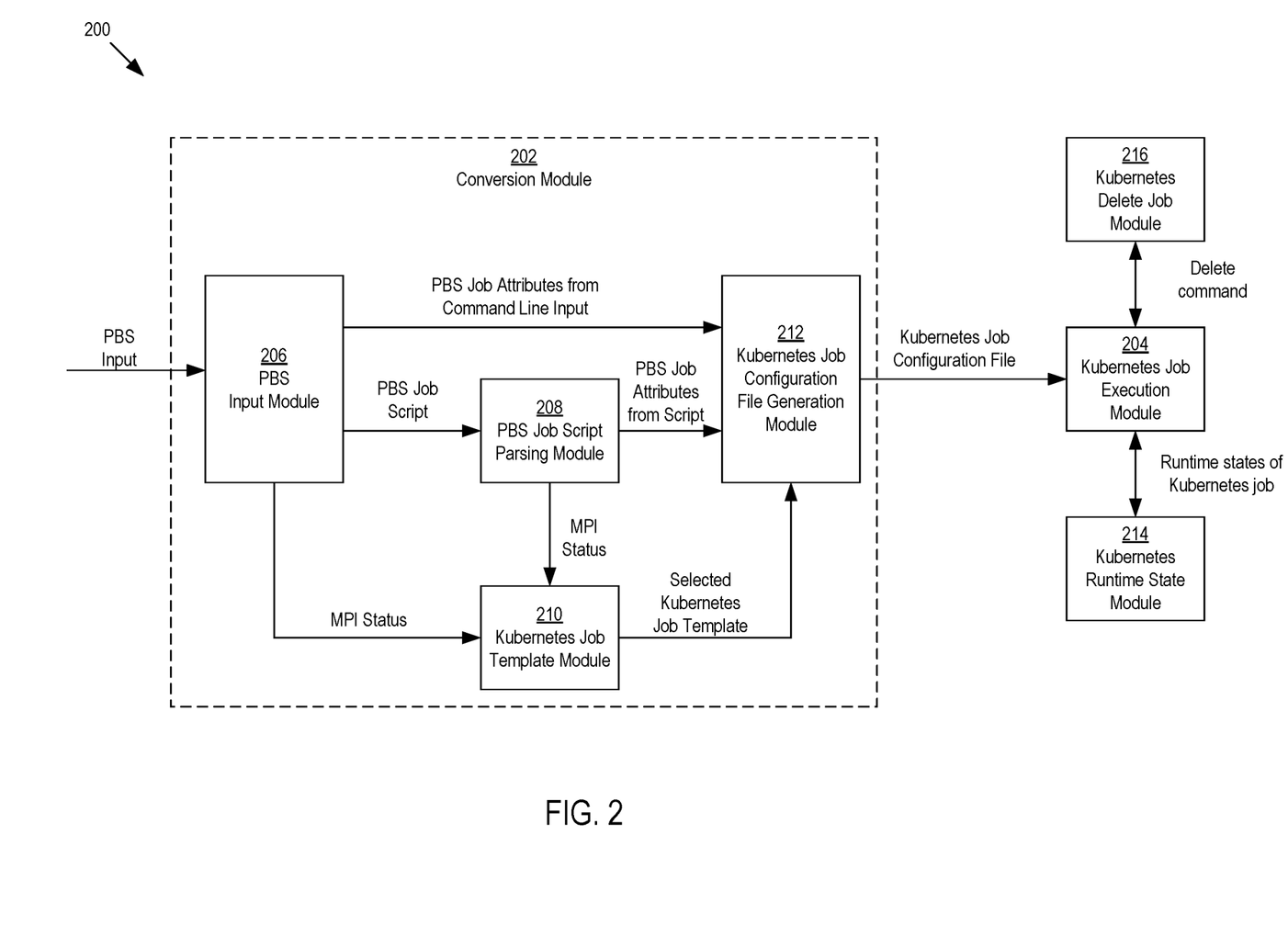
FIG. 2 is a block diagram of an example system that performs jobs Kubernetes based on PBS job inputs.

FIG. 2 is a block diagram of an example system 200 that is configured to execute PBS jobs in a Kubernetes system. To do so, the system 200 is configured to convert PBS job inputs associated with PBS jobs into corresponding Kubernetes job configuration files, and then execute Kubernetes jobs according to the Kubernetes job configuration files. In this way, a PBS job input is generated, but the Kubernetes system 104, rather than the PBS system 102, performs the processes of the PBS job associated with the PBS job input, as a Kubernetes job, such as by performing the processes using clusters, containers, and pods available in the Kubernetes system 104.

In various embodiments, the system 200 may be separated or organized into a conversion module 202 and a Kubernetes job execution module 204. The conversion module 202 is configured to perform a conversion process that converts PBS job inputs associated with PBS jobs to corresponding Kubernetes job configuration files. The Kubernetes job execution module 204 is configured to execute Kubernetes jobs corresponding to the Kubernetes job configuration files generated or created by the conversion module 202. The Kubernetes job execution module 204 may be a component of the Kubernetes system 104 of FIG. 1. The conversion module 202 may be implemented in any of various ways. For example, in some embodiments, the conversion module 202 may be a component 202 of the PBS system 102. In other embodiments, the conversion module 202 may be a component of the Kubernetes system 104. In still other embodiments, the conversion module 202 may be a stand-alone system, or a component of a non-PBS and/or non-Kubernetes computer system that is not configured to perform any PBS or Kubernetes functions other than convert a PBS job input to a Kubernetes job configuration file. Other embodiments may include any of various combinations of the aforementioned embodiments. For example, in various embodiments, some elements (e.g., hardware, software, and/or functional elements) of the conversion module 202 may be part of the PBS system 102 while other elements of the conversion module 202 are part of the Kubernetes system 104; some elements of the conversion module 202 may be part of the PBS system 102, while other elements of the conversion module 202 are part of a non-PBS/non-Kubernetes computer system; some elements of the conversion module 202 may be part of the Kubernetes system 104 while other elements of the conversion module 202 are part of a non-PBS/non-Kubernetes computer system; or some elements of the conversion module 202 are part of the PBS system 102, other elements of the conversion module 202 are part of the Kubernetes system 104, and still other elements are part of a non-PBS/non-Kubernetes computer system. Various ways of implementing the conversion module 202 into a computing system, or network of computing systems, in order to convert a PBS job input into a Kubernetes job configuration file configured to be executed by the Kubernetes system 104 and/or the Kubernetes job execution module 204 may be possible.

Also, in general as used herein, a module may be hardware or a combination of hardware and software. For example, each module may include one or more application specific integrated circuits (ASIC), one or more field programmable gate arrays (FPGA), one or more circuits, one or more digital logic circuits, one or more analog circuits, any of various combination of discrete circuits, gates, or any other type of hardware or combination thereof. In various embodiments, the one or more hardware or software elements of a module may be implemented into a computer system, or network or computer systems, in any of various ways, including those configured to perform PBS functions of the PBS system 102, Kubernetes functions of the Kubernetes system 104, or combinations thereof. In addition or alternatively, each module may include memory hardware that comprises instructions executable with at least one processor or processor circuitry to implement one or more of the features of the module. When any one of the module includes the portion of the memory that comprises instructions executable with the at least one processor, the module may or may not include the at least one processor. In some examples, each module may just be the portion of the memory that comprises instructions executable with the at least one processor to implement the features of the corresponding module without the module including any other hardware. Because each module includes at least some hardware even when the included hardware comprises software, each module may be interchangeably referred to as a hardware module.

In further detail, the conversion module 202 includes a plurality of modules (or sub-modules), including a PBS input module 206, a PBS job script parsing module 208, a Kubernetes job template module 210, and a Kubernetes job configuration file generation module 212. As described in further detail below, each of the modules 206-212 performs an associated set of one or more functions to convert a PBS job input to a Kubernetes job configuration file. Other configurations for the conversion module 202, such as ones that include more, fewer, and/or different modules from the ones shown in FIG. 2, in order to perform the conversion process may be possible.

The PBS job input module 206 is configured to receive, identify, access, and/or store PBS job inputs. The PBS job input module 206 may also be configured to identify a triggering event, and start a conversion process that converts a PBS job input into a corresponding Kubernetes job configuration file in response to the triggering event. In particular embodiments, the conversion start command also operates to cause the Kubernetes job execution module 204 to perform a Kubernetes job corresponding to the PBS job input upon creation of the corresponding Kubernetes job configuration file, without additional human intervention. That is, once the conversion module 202 creates a Kubernetes configuration file based on a PBS job input, no human intervention, such as user input, is needed for the corresponding Kubernetes job to be executed.

In various embodiments, the triggering event is a conversion start command input into the PBS job input module 206. The conversion start command may be a user input that the user enters into the PBS job input module 206 using an input device, such as a keyboard, touchscreen, or microphone as non-limiting examples. In particular embodiments, the conversion start command is similar to, such as by being a derivative of, a PBS "qsub" command used in the PBS system 102 to run PBS jobs. An example derivative is "kube-qsub" although other derivatives of, or other ways of configuring the conversion start command to be similar to, "qsub" may be possible. Configuring the conversion start command to be similar to the PBS qsub command may facilitate the conversion process and/or the execution of the job in Kubernetes, particularly for users who are only familiar with PBS. For example, a PBS user would create the PBS job input for execution of a PBS job just as he/she normally would, except instead of entering "qsub," the PBS user enters a slightly different command, such as "kube-qsub." In response, the conversion module 202 converts the PBS job input associated with the conversion start command, such as "kube-qsub," into a Kubernetes job configuration file, and then the Kubernetes job execution module 204 performs a Kubernetes job according to the created Kubernetes job configuration file.

Upon detecting the triggering event, the PBS job input module 206 may identify the PBS job input. For at least some embodiments where the triggering event is a conversion start command, the PBS job input is an argument of the conversion start command. Accordingly, for such embodiments, the PBS job input module 206 identifies the PBS job input by identifying the argument of the conversion start command.

Additionally, the PBS input module 206 is configured analyze or parse a PBS input for PBS job scripts and PBS job command line inputs. In various embodiments, a given PBS job input may include one or more PBS job scripts, one or more PBS job command line inputs, or a combination of one or more PBS job scripts and one or more PBS job command line inputs. In general, as described in further detail below, a PBS job input may include one or more PBS job attributes (also called PBS job options), defining or characterizing a PBS job, that the conversion module 202, specifically the Kubernetes job configuration file generation module 212, uses to create a Kubernetes job configuration file. A PBS job script may include a set of one or more PBS job attributes, and may have an associated script name. A PBS job command line input may be, or expressly indicate, one or more PBS job attributes, without being part of a PBS job script. Upon analyzing or parsing a PBS job input, if the PBS input module 206 identifies a PBS job script, the PBS input module 206 may send the PBS job script to the PBS job script parsing module 208 for further parsing or analysis. In addition, if the PBS input module 206 identifies a PBS job command line input, the PBS input module 206 may directly send the PBS job command line input as a PBS job attribute to the Kubernetes job configuration file generation module 212 for generation of a Kubernetes job configuration file.

In various embodiments, a PBS job attribute in or of a PBS job command line input may be indicated by a predetermined flag or prefix, such as "-C" in accordance with PBS specifications. For such embodiments, the PBS input module 206, when parsing a PBS command line, may be configured to search for and detect the predetermined flag. In response to detecting the predetermined flag, the PBS input module 206 may identify the PBS job attribute of the PBS job command line input, and send the PBS job attribute to the Kubernetes job configuration file generation module 212.

In addition, the PBS job script parsing module 208 is configured to analyze or parse PBS job scripts to determine PBS job attributes to send to the Kubernetes job configuration file generation module 212. Based on the parsing, the PBS job script parsing module 208 is configured to identify two types of PBS job attributes: PBS directives and PBS contents. In general, a PBS directive specifies resource requirements and other specification or parameters of a PBS job. A PBS content includes, effectively, information in a PBS job script other than the PBS directives.

In accordance with PBS specifications, a PBS directive is a statement that begins with a predetermined prefix. In particular configurations, the predetermined prefix is "#PBS" although other predetermined prefixes may be possible. Upon identifying a given predetermined prefix, the PBS job script parsing module 208 may identify that a certain portion of data in the PBS job script following the given predetermined prefix is a PBS directive. Upon identifying a PBS directive in a PBS job script, the PBS job script parsing module 208 may send the PBS directive as a PBS job attribute to the Kubernetes job configuration file generation module 212.

In addition, as mentioned, the PBS job script parsing module 208 may identify PBS contents in a PBS job script as PBS job attributes other than PBS directives. One type of PBS content that the PBS job script paring module 208 identifies is a shell interpreter, such as "bin/bash," "bin/csh," "bin/ksh," and "bin/tcsh" as non-limiting examples. For at least some embodiments, the shell interpreter is identifying in a PBS job script by a predetermined character sequence, such as a predetermined index. In particular configurations, the predetermined prefix is a shebang (#!) although other types of predetermined prefixes are possible. Another type of PBS content is a shell script. Upon identifying a PBS content, the PBS job script parsing module 208 may send the PBS content to the Kubernetes job configuration file generation module 212. For at least some embodiments, the PBS job script parsing module 208 may first determine the PBS directives, and then determine the PBS content items after determining all of the PBS directives. In particular embodiments, the PBS job script parsing module 208 may perform a removal process, such that it identifies the PBS directives as being removed or deleted from a PBS job script, in order to identify PBS content remaining in the PBS job script.

The Kubernetes jobs template module 210 is configured to select a Kubernetes jobs template from among a plurality of Kubernetes jobs templates to use for creation of a Kubernetes job configuration file. In particular embodiments, the Kubernetes jobs template module 210 has two templates to choose from: a default Kubernetes jobs template and a Message Passing Interface (MPI) jobs template. If a PBS job associated with a given PBS job input is a MPI job, then the Kubernetes jobs template module 210 may select the MPI jobs template for creation of a Kubernetes job configuration file. Otherwise, if a PBS job associated with a given PBS job input is not a MPI job, then the Kubernetes jobs template module 210 may select a default Kubernetes jobs template for creation of a Kubernetes job configuration file.

In further detail, in various embodiments, a given PBS job may have an associated MPI status indicating whether or not the PBS job is an WI job. For such embodiments, the MPI status is included in a PBS job script or is a PBS job command line input. For embodiments where the MPI status is included in a PBS job script, the PBS job script parsing module 208 may determine the MPI status when parsing the PBS job script, and send the MPI status to the Kubernetes jobs template module. In addition, for embodiments where the MPI status is included in a PBS job command line input, the PBS input module 206 may determine the MPI status, and send the MPI status to the Kubernetes jobs template module 210. In response to receipt of the MPI status, the Kubernetes jobs template module 210 may select the MPI jobs template if the MPI status indicates that the PBS job is a MPI job, and may select the default Kubernetes jobs template if the MPI status indicates that the PBS job is not a MPI job. Upon selection of a Kubernetes job template, the Kubernetes job template module 210 may send the selected Kubernetes job template to the Kubernetes job configuration file generation module 212 for creation of a Kubernetes job configuration file.

The Kubernetes job configuration file generation module 212 may generate or create a Kubernetes job configuration file by populating fields of a selected Kubernetes template with data values of PBS job attributes it receives from the PBS job script parsing module 208 and the PBS input module 206. The Kubernetes jobs configuration file generation module 212 may populate the fields with the data values according to predetermined conversion rules, as described in further detail below. In addition, for at least some embodiments, the Kubernetes job configuration file generation module 212 may initially generate or create a Kubernetes job configuration file in the form of a YAML data file. The Kubernetes job configuration file generation module 212 may then convert, of the Kubernetes job execution module 204 may convert, the YAML file into a JavaScript Object Notation (JSON) file to execute or run an associated Kubernetes job. Other formats in which the Kubernetes job configuration file generation module 212 may generate Kubernetes job configuration files may be possible.

In addition, each PBS job attribute sent to the Kubernetes job configuration file generation module 212 may include an associated attribute type indicator that indicates a type of the PBS job attribute and an associated data value. For at least some embodiments, an attribute type indicator of a PBS directive is indicated by "-α", where α is an upper-case or a lower-case letter. A data value may be associated with a given attribute type indicator, such as by following the attribute type indicator. Upon receipt of a given PBS job attribute, the Kubernetes job configuration file generation module 212 may use the attribute type indicator to determine a location or field in a selected Kubernetes job template, and then include the associated data value in the determined location or field.

To illustrate, the PBS job attribute "-N job-example" includes two parts, the attribute type indicator "-N" and the associated data value "job-example." The attribute type indicator "-N" indicates that the PBS descriptor is a "name" of the associated PBS job, and the data value "job-example" indicates that the name of the associated PBS job is "job-example." Accordingly, upon receipt of the PBS job attribute "-N job-example," the Kubernetes job configuration file generation module 212 identifies that the received PBS job attribute is identifying a "name" of the PBS job, in turn, determines a "name" location or field of a Kubernetes job configuration file it is creating, and then includes the data value "job-example" in the "name" location or field of the Kubernetes job configuration file.

Also, in various embodiments, some PBS directors include both an attribute type indicator and an attribute sub-type indicator. For example, the PBS job attribute (or option) "-l walltime=hh:mm:ss" includes three parts, including the attribute type indicator "-l ", the attribute sub-type indicator "walltime" and the data value "hh:mm:ss." The combination of the type and sub-type indicators "-l walltime" indicates that PBS descriptor is identifying an amount of time needed for the PBS job, and "hh:mm:ss" is a data value of the amount of time in hours, minutes, and seconds. Different attribute sub-types may include the same attribute type indicator. For example, the attribute type indicator "-l " is associated with several sub-types, in accordance with PBS specifications.

The following is a non-exhaustive list of PBS attribute type indicators, and how the Kubernetes job configuration file generation module 212 populate fields of a selected Kubernetes job template:

The PBS attribute type indicator "-N" indicates or declares a name for a corresponding Kubernetes job. The Kubernetes job configuration file generation module 212 populates the data value associated with "-N" in a metadata field, such as a "metadata.labels.jobname" field, of the Kubernetes job template. If a name "-N" PBS job descriptor is not include in a given PBS job input, the Kubernetes job configuration file generation module 212 may assign a random name/string for that field. In various embodiments, the conversion module 202 displays the Kubernetes job name through an output message of the conversion start command, such as "kube-qsub."

The PBS attribute type indicator "-v" indicates a comma separated list of strings in the form "variable" or "variable=value." Upon detection of the "-v" attribute type indicator, the Kubernetes job configuration module 212 includes or populates the data value in an (the "variable or "variable=value") in an environmental variables field, such as a "spec.template.spec.containers[ ].env[ ]" field, of the Kubernetes job template.

The PBS attribute type indicator "-V" declares that all environment variables in the qsub commands environment are to be exported to batch jobs. Upon detection of the "-V" attribute type indicator, the Kubernetes job configuration module 212 includes all environment variables from the PBS job input in an environmental variables field, such as the "spec.template.spec.containers[ ].env[ ]" field, of the Kubernetes job template.

The PBS attribute type indicator "-q" defines a destination of a job, such as a queue, a server, or a queue at a server. However, Kubernetes does utilize queue prioritization. As such, the Kubernetes job configuration module 212 may identify the queues associated with "-q" as labels of special resources, such as graphics processing unit (GPU) node, high-input/output (TO) node, etc. Additionally, labels of a Kubernetes job configuration file may be created in advance of job execution. Accordingly, upon detection of the "-q" attribute type indicator, the Kubernetes job configuration file generation module 212 may include or populate the associated data value in a Kubernetes node assignment field, such as a "spec.template.spec.nodeSelector.queue" field, of the Kubernetes job template. In various embodiments, the Kubernetes node assignment field is a "nodeSelector" field, as indicated. Other Kubernetes node assignment fields, such as a Kubernetes nodeSelect group field (e.g., "spec.template.spec.nodeSelector.group") are possible. In general, when the Kubernetes job configuration file generation module 212 includes the associated data value in a Kubernetes node assignment (or nodeSelector) field, the field filters on labels specified when a Kubernetes cluster is created.

The PBS attribute type indicator "-J" launches a list of jobs. Upon detection of the "-J" attribute type indicator, the Kubernetes job configuration file generation module 212 may generate a plurality of, or several, Kubernetes job configuration files, such as YAML files. In each Kubernetes job configuration file, the Kubernetes job configuration file generation module 212 may include or populate the environmental variable "PBS_ARRAY_INDEX" in an environmental variables field, such as the "spec.template.spec.contains[ ].env[ ]" field, and set PBS_ARRAY_INDEX to 1 through a present value.

The PBS attribute type indicator "-t" specifies task identifiers (IDs) of a job array. Upon detection of the "-t" attribute type indicator, the Kubernetes job configuration file generation module 212 may generate a plurality of, or several, Kubernetes job configuration files, such as YAML files. In each Kubernetes job configuration file, the Kubernetes job configuration file generation module 212 may include or populate the environmental variable "PBS_ARRAYID" in an environmental variables field, such as the "spec.template.spec.contains[ ].env[ ]" field, and set PBS_ARRAYID to 1 through a present value.

Additionally, in various embodiments, the Kubernetes job configuration file generation module 212 may ignore the following PBS attribute type indicators: "-a"; "-A"; "-c"; "-j"; "-m"; "-M"; "-p"; "-r"; "-S"; "-W"; "-z"; "-u"; "-e"; "-o".

Additionally, PBS directives that include or lead with the attribute type indicator "-l" are PBS resource statements that define resources for an associated PBS job. The following describes how the Kubernetes job configuration file generation module 212 may populate a Kubernetes template based on PBS resource statements included in a PBS job input.

The PBS attribute type indicators "-l cput"; "-l soft_walltime"; or "-l walltime" each may set a time period, an expiration of which causes PBS jobs to timeout. Upon detection of one or more of the attribute type indicators "-l cput"; "-l soft_walltime"; or "-l walltime," the Kubernetes job configuration file generation module 212 may include an associated data value in an active deadline field, such as spec.template.spec.activeDeadlineSeconds, of the Kubernetes job template.

The PBS attribute type indicator "-l node" may indicate a number of nodes to be used in a PBS job, which in turn may be used to set a number of pods for an associated Kubernetes job. Upon detection of "-l node", the Kubernetes job configuration file generation module 212 may include a data value associated with "-l node" in a parallelism field, such as "spec.parallelism" and/or a completions field, such as "spec.completions," of the Kubernetes job template.

The PBS attribute type indicators "-l ncpus"; "-l ppn"; "-l procs" each define a number or processors allocated to each node. For at least some embodiments, the Kubernetes system 104 runs one process for each pod. For such embodiments, upon detection of "-l ncpus"; "-l ppn"; "-l procs", the Kubernetes job configuration file generation module 212 may set a number of pods in the Kubernetes job configuration file to a product of a number of nodes and a data value associated with "-l ncpus"; "-l ppn"; "-l procs". The Kubernetes job configuration file generation module 212 may set the number of pods by including the product value in a parallelism field, such as spec.parallelism, and/or a completions field, such as spec.completions, in the Kubernetes job template.

The PBS attribute type indicator "-l ngpus" indicates a number of GPUs required for a PBS job. Upon detection of "-l ngpus", the Kubernetes job configuration file generation module 212 may include the associated data value in a GPU number field of the Kubernetes job template. For at least some embodiments, the GPU number and/or the field may depend on a plugin installed in one or more clusters of the Kubernetes system 104, such as NVIDIA's k8s-device-plugin, as a non-limiting example.

The PBS attribute type indicator "-l ompthreads" is used to set a number of threads for a job. Upon detection of "-l ompthreads," the Kubernetes job configuration file generation module 212 includes the associated data value OMP_NUM_THREADS in a container environment variables field, such as "spec.template.spec.containers[ ].env[ ]," of the Kubernetes job template. In various embodiments, the Kubernetes job configuration file generation module 212 may also include the data value OMP_NUM_THREADS in a container cpu field, such as "spec.template.spec.containers[ ].resources.requests.cpu" of the Kubernetes job template.

The PBS attribute type indicator "-l pmem" indicates a total amount of physical memory for an individual process. Upon detection of "-l pmem," the Kubernetes job configuration file generation module 212 may include the associated data value in a resources field, which in various embodiments may be one of plurality of containers fields, such as a "spec.template.spec.containers[ ].resources.requests.memory" field, of the Kubernetes job template. If the total amount of physical memory pmem is not specified in the PBS job input, the Kubernetes Job configuration file generation module 212 may be configured to include in the containers field a default value. For at least some of these embodiments, the Kubernetes job configuration file generation module 212 first sets the default value in bytes, and then converts the bytes value to kilobytes (KB), and appends the KB suffix to the converted value in the containers field.

The PBS attribute type indicator "-l mem" indicates a total amount of physical memory for a job. Upon detection of "-l mem," the Kubernetes job configuration file generation module 212 may divide the associated data value by a number of pods, and include the resulting quotient in a resources field, which in various embodiments may be one of a plurality of containers fields, such as "spec.template.spec.containers[ ].resources.requests.memory" field, of the Kubernetes job template.

The PBS attribute indicator "-l arch" specifies a required administrator defined system architecture. Upon detection of "-l arch," the Kubernetes job configuration file generation module 212 may assign the associated data value to a Kubernetes node, such as by including the data value in a Kubernetes node assignment field, such as a "spec.template.spec.nodeSelector" field, of the Kubernetes job template.

In various embodiments, the Kubernetes job configuration file generation module 212 may ignore one or more of the following PBS attribute indicators if indicated in a PBS job input: accelerator, accelerator_memory, host, accelerator_model, aoe, energy, eoe, exec_vnode, file, hbmem, naccelerators, nchunk, nice, pcput, preempt_targets, pvmem, vmem, vnode, site, software, start_time, max_walltime, min_walltime, and vntype.

In addition, in order to run a PBS job, the PBS system 102 may create a plurality of PBS environment variables at qsub runtime, and then use those PBS environment variables to perform the PBS job. In a similar manner, the Kubernetes job configuration file generation module 212 may populate a Kubernetes job template with a plurality of PBS environment variables indicated by a PBS job input, for execution of a Kubernetes job. In various embodiments, the Kubernetes job configuration file generation module 212 is configured to include one or more PBS variables in one or more environment variables fields of a Kubernetes job template. In particular embodiments, a name of a given PBS environment variable is included in a name field, such as "spec.template.spec.containers[ ].env[ ].name", and a data value associated with the name is included an associated value field, such as "spec.template.spec.containers[ ].env[ ].value." The following provides a non-exhaustive list of PBS environment variables, including its name and associated data value included in respective name and value fields of an environmental variable field set.

The environment variable name "PBS_O_HOME" has an associated data value that is the environment $HOME of the current shell where the conversion start command, such as "kube-qsub" is executed.

The environment variable name "PBS_O_HOST" has an associated data value that is the environment $HOST of the current shell where the conversion start command, such as "kube-qsub," is executed.

The environment variable name "PBS_O_LANG" has an associated data value that is the environment $LANG of the current shell where the conversion start command, such as "kube-qsub," is executed.

The environment variable name "PBS_O_LOGNAME" has an associated data value that is the environment $USER of the current shell where the conversion start command, such as "kube-qsub," is executed.

In various embodiments, The Kubernetes job configuration file generation module 212 may ignore or disregard the environment variable name "PBS_O_PATH" (an environment variable initialized to environment $PATH), in event that the PATH environment for Kubernetes containers is sufficiently different to the host device executing the conversion start command, such as "kube-qsub."

The environment variable name "PBS_O_MAIL" has an associated data value that is the environment $MAIL of the current shell where the conversion start command, such as "kube-qsub" is executed.

The environment variable name "PBS_O_SHELL" has an associated data value that is the environment $SHELL of the current shell where the conversion start command, such as "kube-qsub" is executed.

The environment variable name "PBS_O_TZ" indicates the timezone information of the PBS system 102. In various embodiments, the Kubernetes job configuration file generation module 212 ignores this environment variable, under the presumption that the cluster of the Kubernetes job execution module 204 and/or the Kubernetes system 104 is running the associated Kubernetes job in a different timezone from the PBS system 102.

The environment variable name "PBS_O_WORKDIR" provides a directory where the conversion start command, such as "kube-qsub" is executed. For at least some embodiments, the Kubernetes job configuration file generation module 212 is configured to obtain this environment variable by including, in the Kubernetes job configuration file, a Python statement: "os.path.abspath(os.curdir)."

The Kubernetes job configuration file generation module 212 is configured to set a data value for the environment variable name "PBS_JOBID" to be the same Kubernetes job ID included in the metadata fields, such as the job ID data value included in a "metadata.labels.jobid" field of the Kubernetes job template.

The Kubernetes job configuration file generation module 212 is configured to set a data value for the environment variable name "PBS_JOBNAME" to be the same Kubernetes job name included in the metadata fields, such as the "jobname" data value included in a "metadata.labels.jobname" field in the Kubernetes job template.

With respect to the environment variable name "PBS_NODEFILE," for at least some embodiments, for MPI jobs, such as Volcano MPI jobs, the Kubernetes job configuration file generation module 212 is configured to set the associated data value to "/etc/volcano/mpiworker.host." In addition, for non-MPI jobs, the Kubernetes job configuration file generation module 212 is configured to leave the associated value field empty.

The Kubernetes job configuration file generation module 212 is configured to leave empty the value fields associated with environment variable names "PBS_ARRAY_INDEX" and "PBS_ARRAYID" unless the PBS job attributes from the PBS job script or the PBS command line input includes a PBS directive having a predetermined flag "-J" or "-t".

In addition, as part of the process of creating a Kubernetes job configuration file, the Kubernetes job configuration file generation module 212 may populate certain fields with values it internally generates, such as without using a PBS job attribute from a PBS job script or PBS job command line input. In various embodiments, the Kubernetes job configuration file generation module 212 may perform one or more of the following.

For at least some embodiments, the Kubernetes job configuration file generation module 212 is configured to generate a unique identifier (ID) for a given Kubernetes job. In various embodiments, the Kubernetes job configuration file generation module 212 generates the unique ID through random number generation. Doing so may have the advantage of allowing a user to query a Kubernetes job by inputting a "get jobs" command, such as "kubectl get jobs -l jobid=ID" as a non-limiting example. In addition, the Kubernetes job configuration file generation module 212 may include the unique job ID in a metadata field, such as "metadata.labels.jobid" of the Kubernetes job template.

In addition, so that the Kubernetes job configuration file generation module 212 avoids naming conflicts, it may be configured to populate a metadata name field of the Kubernetes job template according to the following format: "jobname-jobid" where "jobname" is the name or data value associated with the PBS attribute type indicator "-N" and "jobid" is a random number.

In addition, for at least some embodiments, the Kubernetes job configuration file generation module 212 is configured to prevent a Kubernetes job from restarting if successful execution of the Kubernetes job fails. For example, the Kubernetes job configuration file generation file may set a value in the spec.backoffLimit field of the Kubernetes job template to a value of "1." In addition or alternatively, for at least some embodiments, the Kubernetes job configuration file generation module 212 (or another component of the conversion module 202, the Kubernetes job execution module 204, or a component of the Kubernetes system 104) is configured to remove successfully completed Kubernetes jobs from a job history list. To cause this to happen, in various embodiments, the Kubernetes job configuration file generation module 212 may be configured to insert a value (e.g., "86,400") into a spec.ttlSecondsAfterFinished field of the Kubernetes job template. In addition or alternatively, the Kubernetes job configuration file generation module 212 may be configured to prevent a Kubernetes job from restarting by populating a restart policy field, such as "spec.template.spec.restartPolicy" in the Kubernetes job template with a "Never" data value.

In addition, in event that the PBS job input indicates that the PBS job is a MPI job, such as a volcano MPI job, such that the Kubernetes job template module 210 selected an MPI jobs template for the Kubernetes job template, the Kubernetes job configuration file generation module 212 may populate one or more containers field, such as a "spec.tasks[ ].template.spec.containers[ ].command" of the Kubernetes job template with MPI data values for both a master task and a slave task. An example of a master task included in a Kubernetes job template is:

```
command:
    - /bin/sh
    - -c
    - |
        export PBS_NODEFILE=/etc/volcano/mpiworker.host;
        mkdir -p /var/run/sshd; /usr/sbin/sshd;
        mpirun –hostfile=$PBS_NODEFILE contents-of-the-shell-script
```

In addition, an example of a slave task included in a Kubernetes job template is:

```
command:
    - /bin/sh
    - -c
    - |
        export PBS_NODEFILE=/etc/volcano/mpiworker.host;
        mkdir -p /var/run/sshd; /usr/sbin/sshd;
```

The slave task may only bring up the sshd daemon in the slave workers.

On the other hand, in event that the PBS job input indicates that the PBS job is not a MPI job, such that the Kubernetes job template module 210 selected a default Kubernetes job template for the Kubernetes job template, the Kubernetes job configuration file generation module 212 may populate one or more containers field, such as a "spec.tasks[ ].template.spec.containers[ ].command" of the Kubernetes job template with non-MPI data values. An example of data value for a non-MPI or default Kubernetes job template is:

```
                    command:
                        - /bin/sh
                        - -c
                        - contents-of-the-shell-script
```

In accordance with the above, the following is an example PBS job script that the PBS input module 206 may receive, and that the PBS job script parsing module 208 may parse in order to determine PBS job attributes that are, in turn, provided to the Kubernetes job configuration file generation module 212 for generation of a corresponding Kubernetes job configuration file:

```
                #!/bin/bash
                #PBS -N job-example
                #PBS -l ncpus=2,mem=16gb
                #PBS -l walltime=01:00:00
```

-continued

```
                #PBS -q tsmall
                /home/jovyan/pi 1000000
```

As indicated, the PBS job script is a non-MPI job script. Accordingly, the PBS job script parsing module 208 may send the MPI status indicating the PBS job script is for a non-MPI PBS job. In response, the Kubernetes job template module 210 may select the default Kubernetes job template, and send the default Kubernetes job template to the Kubernetes job configuration file generation module 212. The following is an example Kubernetes job configuration file that the Kubernetes job configuration file generation module 212 may generate using the default Kubernetes job template according to the above PBS job script:

```
apiVersion: batch/v1
kind: Job
metadata:
    name: job-example-5400ced2
    labels:
    -jobname: job-example
    -jobid: 5400ced2
spec:
    backoffLimit: 1
    completions: 1
    parallelism: 1
    template:
        spec:
            restartPolicy: Never
            terminationGracePeriodSeconds: 30
            nodeSelector:
                group: tke-small
            containers:
            - name: job-example
                image: python
                command:
                - /bin/bash
                - -c
                - "/home/jovyan/pi 1000000"
                resources:
                    requests:
                        cpu: 2
                        memory: 16Gb
                env:
                    - name: PBS_O_HOME
                        value: "/home/jovyan"
                    - name: PBS_O_HOST
                        value: "OFFICE-DESKTOP-MB0"
                    - name: PBS_O_LANG
                        value: "en_US.UTF-8"
                    - name: PBS_O_LOGNAME
                        value: "jovyan"
                    - name: PBS_O_MAIL
                        value: ""
                    - name: PBS_O_SHELL
                        value: "/bin/bash"
                    - name: PBS_O_WORKDIR
                        value: "/home/sfls/kube-pbs/example"
                    - name: PBS_JOBNAME
                        value: "job-example"
                    - name: PBS_JOBID
                        value: "5400ced2"
```

Upon completing generation of a Kubernetes job configuration file, the Kubernetes job configuration file generation module 212 may send the Kubernetes job configuration file to the Kubernetes job execution module 204 for execution or running of an associated Kubernetes job. At various points during execution of the Kubernetes job, including at the start, at the end, or some point in between, the Kubernetes job may have associated runtime states. For at least some embodiments, the Kubernetes job execution module 204 is configured to send one or more runtime states associated with a Kubernetes job to a Kubernetes runtime state module 214. For at least some of these embodiments, the Kubernetes runtime state module 214 includes, or is coupled to, a display that is configured to display one or more runtime states received from the Kubernetes job execution module 204.

In addition, for at least some embodiments, the Kubernetes runtime state module 214 is configured to send a runtime state command to the Kubernetes job execution module 204 in order to receive a runtime state from the Kubernetes job execution module 204. In particular example embodiments, the runtime state command is similar in functionality and/or effect as the PBS command "qstat" and also the Kubernetes command "kubectl get jobs." In addition, in various embodiments, the runtime state command may have a name and/or format similar to, such as by being a derivative of the PBS command "qstat". An example name of the runtime state command is "kube-qstat." By being similar to "qstat" a PBS user familiar with programming in PBS can utilize the runtime command similar to how he/she would use "qstat" and thus can leverage the benefits of having a job performed in Kubernetes without having to learn how to use Kubernetes.

In addition, in various embodiments, if the Kubernetes runtime state module 214 receives a runtime state command, and/or sends the runtime state command to the Kubernetes execution job execution module 204, without any options (e.g., data values associated with job attributes), the Kubernetes job execution module 204 may return, and/or the Kubernetes runtime state module 214 may output, such as by displaying, a list of all jobs being run (the equivalent of "kubectl get jobs-all-namespaces" in Kubernetes).

In addition or alternatively, in response to receiving a runtime state command and/or sending a runtime state command to the Kubernetes job execution module 204, the Kubernetes runtime state module 214 may receive from the Kubernetes job execution module 204, and/or may output (such as by displaying), one or more runtime states. Example runtime states include, but not limited to: a job ID (job-id), a name of a job (job-name), a CPU time (cpu-time), and/or a state of a job (job-state). In addition or alternatively, the Kubernetes runtime state module 214 may be configured to receive and/or display one or more run time states in response to receiving, and/or extracting from a Kubernetes "kubectl get jobs" output. For example, the Kubernetes runtime state module 214 may be configured to obtain a job ID by accessing a data value from an output attribute metadata.labels.jobid of each item in a Kubernetes kubectl get jobs output. In addition or alternatively, the Kubernetes runtime state module 214 may be configured to obtain a job name by accessing a data value from an output attribute metadata.labels.jobname of each item in a Kubernetes kubectl get jobs output. In addition or alternatively, the Kubernetes runtime state module 214 may be configured to obtain a job start time (cpu-time) by access a data value from an output attribute [ ].status.startTime. If [ ].status.completionTime is available, the Kubernetes runtime state module 214 may calculate the job start time (cpu-time) based on a completion time. Otherwise, the Kubernetes runtime state module 214 may calculate the job start time (cpu-time) based on a timestamp of a current time.

Additionally, the Kubernetes runtime state module 214 may obtain one or more of a plurality of states associated with PBS jobs. The below table lists seven job states, three of which (E Q and R) can be obtained for Kubernetes jobs, and the other four of which cannot. The Kubernetes runtime state module 214 may receive and/or output (such as by displaying) the following PBS states according to the actions for Kubernetes jobs listed in following table:

TABLE 1

PBS States and Actions for Kubernetes Jobs

| PBS state | Action for Kubernetes Jobs |
|---|---|
| E: Job is exiting after having run. | Display E if the value of status.conditions.type is "Complete" |
| Q: job is queued, eligible to run or routed. | Display Q if status.active is not 0 and the value of pods.status.phase is Pending |
| R: job is running. | Display R if status.active is not 0 and the value of pods.status.phase is Running |
| H: Job is held. | N/A |
| T: job is being moved to new location. | N/A |
| W: job is waiting for its execution time. | N/A |
| S: (Unicos only) job is suspend | N/A |

Additionally, for at least some example embodiments, the system 200 may include a Kubernetes delete job module 216 configured to delete Kubernetes jobs. In various embodiments, the Kubernetes delete job module 216 may receive a delete command, such as "kube-qdel", and/or output the delete command to the Kubernetes job execution module 204 in order to delete a given Kubernetes job. Additionally, the Kubernetes delete job module 216 may receive as an argument a name of job (job-name) and delete a PBS job having the job-name, in response to the delete command.

Figure 3:
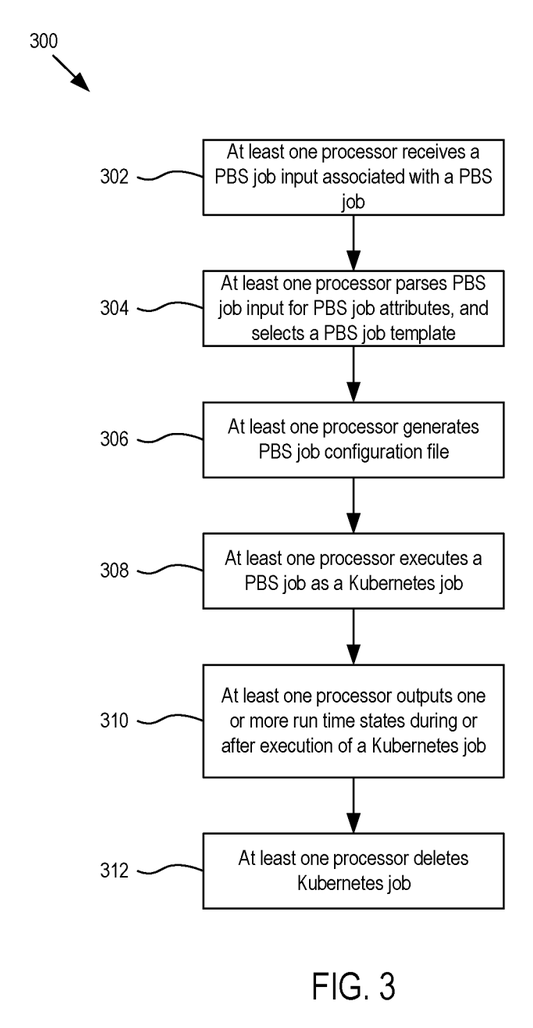
FIG. 3 is a flowchart of method of performing a job in Kubernetes based on a PBS job input.

FIG. 3 is a flow chart of an example method 300 of running a PBS job in Kubernetes. At block 302, at least one processor, such as one executing computer code, and/or configured with the conversion module 202 and/or the Kubernetes job execution module 204, may receive a PBS job input to run a job. For example, a user may enter a PBS job input into a computer system using an input device, and/or the at least one processor may access a memory storing the PBS job input. The PBS job input may include a PBS job script and/or a PBS job command line input. Additionally, for at least some embodiments, at block 302, the at least one processor may receive a command that causes the at least one processor to convert the PBS job input into a Kubernetes job configuration file. In various embodiments, the command also causes a Kubernetes system to run the job (such as to completion), without additional human intervention. In response to detection of the command, the at least one processor may identify the PBS job input as an argument of the command, and use the argument to generate the Kubernetes job configuration file.

At block 304, the at least one processor parses the PBS job input for PBS job attributes. For example, based on the parsing, the at least one processor may identify one or more PBS command line inputs including one or more PBS job attributes, and/or one or more PBS job scripts including one or more PBS job attributes. Upon detection of a PBS job script, the at least one processor may further parse the PBS job script to identify the individual PBS job attributes, including identifying one or more PBS directives and/or one or more PBS contents included in the PBS job script. Additionally, at block 304, the at least one processor may select a PBS job template from among a plurality of PBS job templates for generation of a PBS job configuration file. For example, based on the parsing at block 304, the at least one processor may determine whether the PBS input is for a MPI job. If so, then the at least one processor may select an MPI job template for creation of the Kubernetes job template. If not, then the at least one processor may select a default Kubernetes job template.

At block 306, the at least one processor may generate a Kubernetes job configuration file. The at least one processor may do so by populating fields of the selected Kubernetes job template with data values of the identified Kubernetes job attributes according to predefined or predetermined conversion rules, as previously described. In various embodiments, the at least one processor may first create the Kubernetes job configuration file as a YAML file. For at least some of these embodiments, the at least one processor may convert the YAML file into a JASN for execution of an associated job in Kubernetes. At block 308, the at least one processor, such as with the Kubernetes system 104 and/or the Kubernetes job execution module 204, may execute a Kubernetes job according to the Kubernetes job configuration file.

In addition, for at least some embodiments of the method 300, the at least one processor, such as with the Kubernetes runtime state module 214, may receive and/or output (such as by displaying via a computer display) one or more runtime states of the job executed at block 308. At block 312, the at least one processor deletes the Kubernetes job executed at block 308. For example, the at least one processor may delete or otherwise remove from the Kubernetes system 104 the associated Kubernetes job configuration file as an action to be performed. In various other embodiments, the method 300 does not include outputting one or more runtime states at block 310 and/or deleting the job at block 312.

Figure 4:
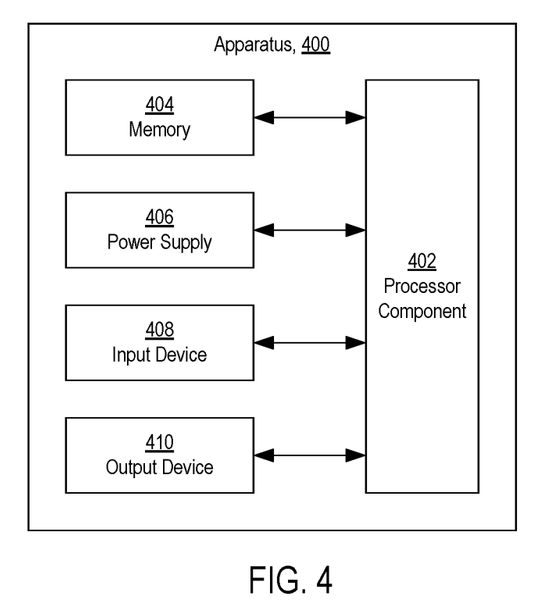
FIG. 4 is a block diagram of structural components of an apparatus, which may be representative of one or more of the components of the systems of FIG. 1 or FIG. 2.

FIG. 4 is a block diagram of a structural components of an apparatus 400 representative of an example configuration for, and/or one or more components of the PBS system 102, the PBS system 104 of FIG. 1, and/or any of the modules of the system 200 of FIG. 2.

The apparatus may include components such as a processor component 402 that includes at least one processor or at least one processing core, a memory 404 of one or more computer readable storage media, a power supply 406, and at least one input device 408. A person skilled in the art may understand that the apparatus structure shown in FIG. 4 does not constitute a limit to the apparatus 400. The apparatus 400 may include more or fewer parts than those shown in the FIG. 4, may combine some parts, or may have different part arrangements.

The processor component 402 may be a controller of the apparatus 400, and is connected to various other parts of the apparatus by using various interfaces and lines or other electrical connections. By running or executing a software program stored in the memory 404, and invoking data stored in the memory 404, the at least one processor 402 executes various functions of the apparatus 400 and performs data processing.

The memory 404 may be configured to store a software program, in the form of computer code and/or instructions. The at least one processor 402 runs the software program in the memory 404 to implement various functional applications and data processing. The memory 404 may mainly include a program storage area and a data storage area. The program storage area may store an operating system, an application program to perform at least one function (such as a sound playing function and an image display function), and the like. The data storage area may store data created according to use of the apparatus 400, and the like. In addition, in various embodiments, the memory 404 may include a random access memory and/or a non-volatile memory, such as at least one magnetic disk storage device, flash memory. In various embodiments, the memory 404 may further include a memory controller, to provide access of the at least one processor 402 to the memory 404.

The power supply 406 supplies power to each component. In an example embodiment, the power supply 406 may be logically connected to the processor component 402 using a power supply management system, so that functions such as management of charging, discharging, and power consumption are implemented by using the power supply management system. The power supply 406 may further include one or more of a direct current or alternating current power supply, a re-charging system, a power failure detection circuit, a power supply converter or inverter, a power supply state indicator, and any other component.

The input device 408 may be configured to receive entered numeric or character information. Non-limiting examples of such an input device may include at least one of: a keyboard, a mouse, a joystick, an optical, a touchscreen, or trackball. In addition or alternatively, the input device 408 may be configured to receive and process an audio input, such as by being configured as a microphone. Other types of input devices to receive and send an input, such as a user input, to the processor component 402 may be possible.

The output device 410 may be configured to output various information from the processor component 402. Example output devices may include a display, such as a computer monitor or other display device, configured to provide a video display. For example, the output device may be configured to display a PBS job input, and/or runtime states, as previously described. In addition or alternatively, the output device 410 may include a speaker configured to audibly output information from the processor component 402.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A system comprising:
at least one memory storing computer code; and
at least one processor configured to execute the computer code, the at least one processor, upon executing the computer code, in order to execute a Kubernetes job according to a portable batch system (PBS) job input for a PBS job, is configured to:
  parse the PBS job input to determine a plurality of PBS job attributes;
  generate a Kubernetes job configuration file based on a plurality of data values of the plurality of PBS job attributes, wherein one of the plurality of data values indicates a number of nodes to be used in the PBS job, and wherein in order to generate the Kubernetes job configuration file, the at least one processor is configured to:
    set a number of pods for the Kubernetes job based on the number of nodes to be used in the PBS job; and
    include the number of pods in at least one of a parallelism field or a completions field in a Kubernetes job template; and
  execute the Kubernetes job according to the Kubernetes job configuration file.

2. The system of claim 1, wherein the PBS job input comprises at least one of a PBS job script or a PBS command line input.

3. The system of claim 1, wherein the at least one processor is configured to parse the PBS job input to identify one or more PBS directives.

4. The system of claim 3, wherein the at least one processor is configured to parse the PBS job input to identify one or more PBS contents.

5. The system of claim 1, wherein the at least one processor, upon executing the computer code, is further configured to select the Kubernetes job template from among a plurality of Kubernetes job templates, in order to generate the Kubernetes job configuration file.

6. The system of claim 5, wherein the at least one processor, upon executing the computer code, is configured to select the Kubernetes job template based on whether the PBS job input indicates a Message Passing Interface (MPI) job.

7. The system of claim 1, wherein the at least one processor, upon executing the computer code, is further configured to include a data value associated with a PBS directive in a containers field of the Kubernetes job template in order to generate the Kubernetes job configuration file.

8. The system of claim 1, wherein the at least one processor, upon executing the computer code, is configured to set the number of pods based on a product of a number of nodes and a number of processors allocated to each node indicated in the PBS job input.

9. The system of claim 1, wherein the at least one processor, upon executing the computer code, is further configured to include a PBS environment variable in an environment variables field of the Kubernetes job template in order to generate the Kubernetes job configuration file.

10. The system of claim 1, wherein the at least one processor, upon executing the computer code, is further configured to include a master task and a slave task into the Kubernetes job template in response to a determination that the PBS job input indicates a Message Passing Interface (MPI) job, in order to generate the Kubernetes job configuration file.

11. The system of claim 1, wherein the at least one processor, upon executing the computer code, is further configured to display, via a computer display, at least one runtime state.

12. The system of claim 1, wherein the at least one processor, upon executing the computer code, is further configured to delete the Kubernetes job.

13. A method comprising:
receiving, with at least one processor, a portable batch system (PBS) job input for a PBS job;
parsing, with the at least one processor, the PBS job input to determine a plurality of PBS job attributes;
generating, with the at least one processor, a Kubernetes job configuration file based on a plurality of data values of the plurality of PBS job attributes, wherein one of the plurality of data values indicates a number of nodes to be used in the PBS job, and wherein generating the Kubernetes job configuration file comprises
setting a number of pods for a Kubernetes job based on the number of nodes to be used in the PBS job; and
including the number of pods in at least one of a parallelism field or a completions field in a Kubernetes job template; and
executing, with the at least one processor, the Kubernetes job according to the Kubernetes job configuration file.

14. The method of claim 13, wherein the PBS job input comprises at least one of a PBS job script or a PBS command line input.

15. The method of claim 13, further comprising:
selecting, with the at least one processor, a Kubernetes job template based on whether the PBS job input indicates a Message Passing Interface (MPI) job to generate the Kubernetes job configuration file.

16. A non-transitory computer readable storage medium storing instructions that are executable by at least one processor, comprising:
instructions executable by the at least one processor to parse a portable batch system (PBS) job input for a PBS job to determine a plurality of PBS job attributes;
instructions executable by the at least one processor to generate a Kubernetes job configuration file based on a plurality of data values of the plurality of PBS job attributes, wherein the instructions to generate the Kubernetes job configuration file comprise:
instructions executable by the at least one processor to set a number of pods for a Kubernetes job based on the number of nodes to be used in the PBS job; and
instructions executable by the at least one processor to include the number of pods in at least one of a parallelism field or a completions field in a Kubernetes job template; and
instructions executable by the at least one processor to run the Kubernetes job according to the Kubernetes job configuration file.

17. The non-transitory computer readable storage medium of claim 16, wherein the PBS job input comprises at least one of a PBS job script or a PBS command line input.

18. The non-transitory computer readable storage medium of claim 16, further comprising instructions executable by the at least one processor to select the Kubernetes job template based on whether the PBS job input indicates a Message Passing Interface (MPI) job to generate the Kubernetes job configuration file.

* * * * *